May 25, 1954 — D. R. BUCHELE ET AL — 2,679,183
DIFFERENTIAL INTERFEROMETER
Filed Oct. 10, 1950 — 3 Sheets-Sheet 1
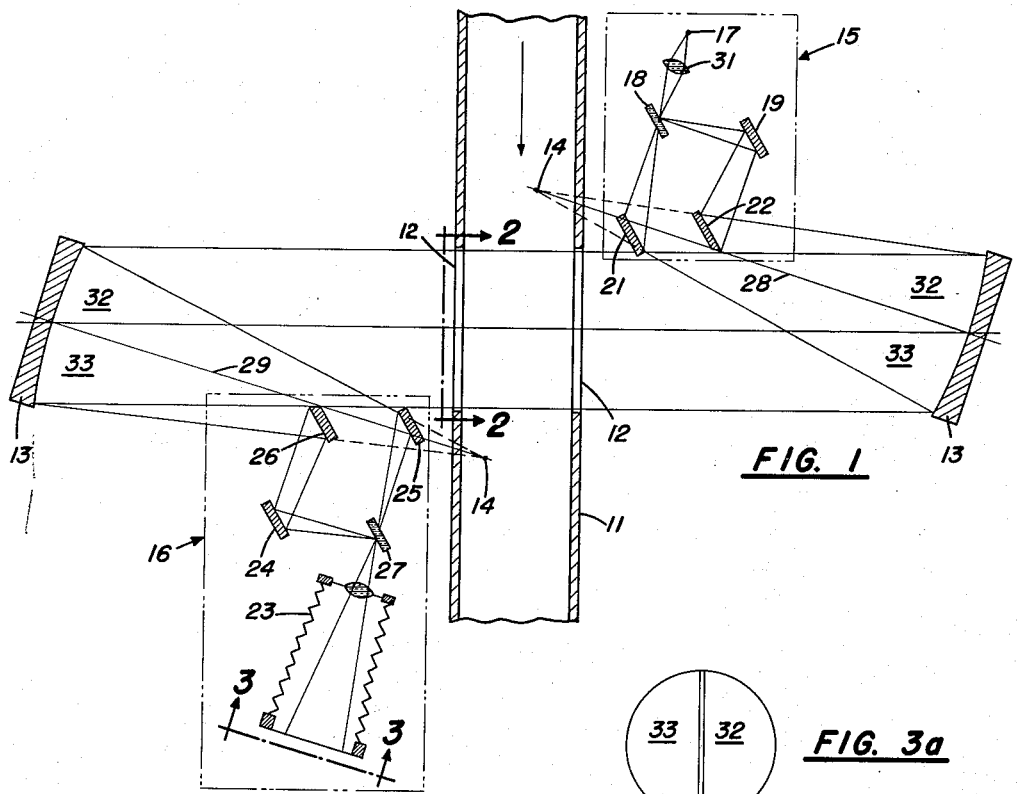
FIG. 1
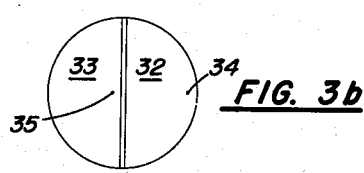
FIG. 3a
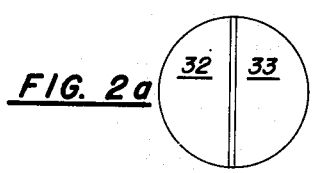
FIG. 2a
FIG. 3b
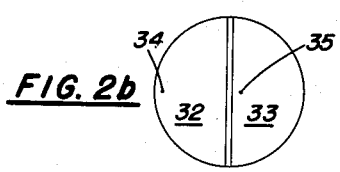
FIG. 2b
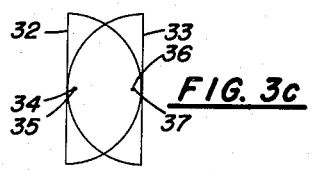
FIG. 3c
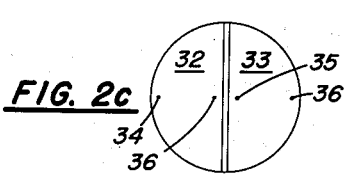
FIG. 2c
Inventors
DONALD R. BUCHELE
PIERCE B. DAY
By
Attorneys May 25, 1954     D. R. BUCHELE ET AL     2,679,183
DIFFERENTIAL INTERFEROMETER Filed Oct. 10, 1950     3 Sheets-Sheet 2

Inventors
DONALD R. BUCHELE
PIERCE B. DAY

By
Walter S. Paul
Attorneys

May 25, 1954
D. R. BUCHELE ET AL
2,679,183
DIFFERENTIAL INTERFEROMETER
Filed Oct. 10, 1950
3 Sheets-Sheet 3
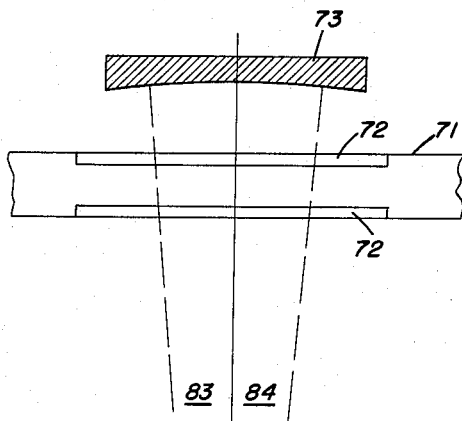
FIG. 7
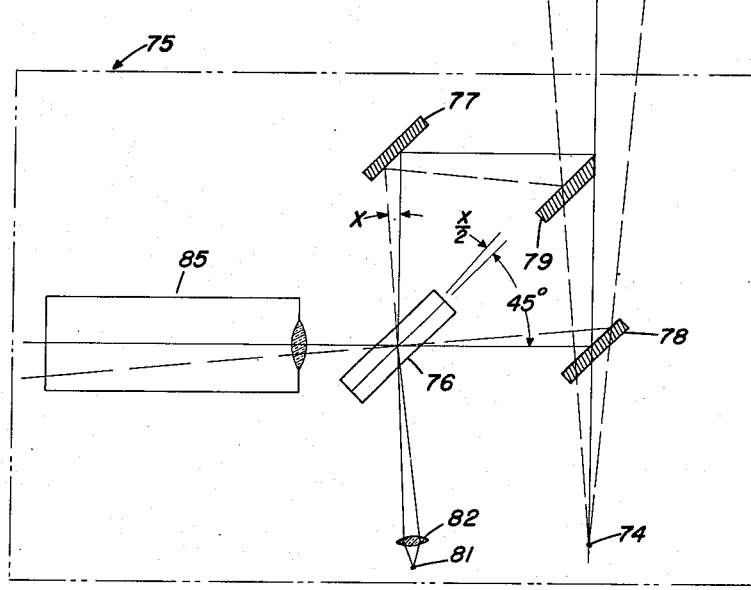
Inventors
DONALD R. BUCHELE
PIERCE B. DAY
By
Walter S. Pawl.
Attorneys Patented May 25, 1954

2,679,183

UNITED STATES PATENT OFFICE 2,679,183

DIFFERENTIAL INTERFEROMETER

Donald R. Buchele, Cleveland, Ohio, and
Pierce B. Day, Rochester, N. Y.

Application October 10, 1950, Serial No. 189,464

8 Claims. (Cl. 88—14)

(Granted under Title 35, U. S. Code (1952),
sec. 266)

The present invention relates to a differential interferometer and more particularly to a differential interferometer for measuring optical path differences by optical interference. Although not limited thereto, the interferometer of the present invention finds its chief application in the measurement of air density in wind tunnels, and the following description will relate principally to that application.

The application of the Mach-Zehnder interferometer to air density measurements has demonstrated the essential validity of the interference method in aerodynamics, and interferometers of this type have become basic working tools for aerodynamic research. There are, however, practical limits to the size of the Mach-Zehnder interferometer and the field which it will cover. In particular, the glass splitter plate used in this interferometer must be the same size as the field of view, and must be thicker than the tunnel windows.

With the advent of larger wind tunnels, it has become increasingly difficult to obtain sufficiently large splitter plates having the optical qualities essential to interferometer use. In addition, the large-size optical components required by this interferometer for present day use entail a massive unwieldy supporting structure. Finally, these components and supporting structure render the interferometer highly sensitive to vibration, which is ever present in wind tunnel operations.

These basic limitations to large-size interferometers have been recognized by the prior art, and attempts have been made to eliminate them. One interferometer has been developed which offers a large working field of parallel light and employs small splitter plates. However, this interferometer, in its simplest form, contains eight mirrors having an aperture equal to the working field, and is less compact than the Mach-Zehnder interferometer it is designed to replace.

The present invention proposes an interferometer of the differential type which eliminates the former limits of practical size of field, and makes interferometer installations in large wind tunnels both practicable and within reasonable economical consideration. The interferometer of the present invention, in one embodiment, is applied to the two-mirror schlieren system which is unquestionably the best for large-size installations, in both optical performance and structural simplicity.

In particular, the present invention proposes an interferometer in which the light passing through the wind tunnel is separated into two parallel beams, a test beam in which the model under test is placed, and a reference beam which can be made to interfere with the test beam. Interference is caused by superposing the two half-circles of the beams, the half-circles being moved so that coherent rays coincide. The maximum size of the working field is therefore somewhat less than one-half the window aperture and the mirror aperture.

Accordingly, an object of the present invention is the provision of a differential interferometer for measuring optical path differences.

A further object is to provide a differential interferometer which is simple and small but possesses a large field of view.

Another object is the provision of a differential interferometer in which the splitter plates may be a small fraction of the size of the field of view.

A still further object of the invention is to provide a differential interferometer which is less sensitive to vibration than conventional interferometers.

Still another object is to provide a differential interferometer which may utilize existing components of standard schlieren apparatus.

Other objects and advantages of the invention will hereinafter become more fully apparent from the following description of the annexed drawings wherein:

Fig. 1 is a schematic diagram, partly in section of one form of the present invention;

Figs. 2a to 2c are cross-sections of the light beams of the present invention taken along the line 2—2 of Fig. 1 at various times during the operation of the same;

Figs. 3a to 3c are views similar to Fig. 2 taken along the line 3—3 of Fig. 1;

Fig. 7 is a schematic diagram, partly in section, of still another form of the present invention employing a single spherical mirror and a single conversion unit.

Figure 5:
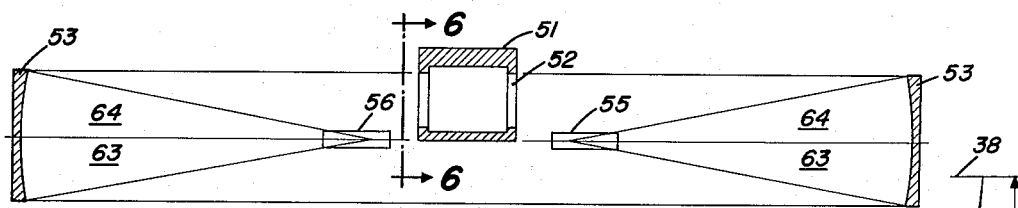
Fig. 5 is a schematic diagram, partly in section, of another form of the present invention for measuring absolute densities.

Referring now to the drawings, wherein like reference characters designate like or corresponding parts throughout the several views, there is shown in Fig. 1, which illustrates a preferred embodiment of the present invention as applied to a typical two-mirror schlieren system, a portion 11 of a conventional wind tunnel having a pair of aligned viewing windows 12 at an intermediate position therein. Positioned on opposite sides, respectively, of portion 11 and in alignment with windows 12 are a pair of parabolic reflectors or mirrors 13, whose focal points are represented at 14.

The other portions of the interferometer according to the present invention may be considered as comprising a source conversion unit, generally designated 15, positioned exteriorly and on one side of portion 11, and a receiver conversion unit, generally designated 16, positioned exteriorly and on the other side of portion 11. Source conversion unit 15 comprises a source of light 17, a splitter plate 18, a pair of front-surface mirrors 19 and 21, and one semi-disc front-surface mirror 22. Receiver unit 16 comprises a light sensitive device 23, such as a camera, a pair of front-surface mirrors 24 and 25, a semi-disc front-surface mirror 26, and a splitter plate 27. It is thus seen that source conversion unit 15 and receiver conversion unit 16 are essentially identical, except that mirror 25 is provided with rotational and translational adjustability, splitter plates 18 and 27 also being rotatable, for the purpose described below.

Conversion unit 15 is arranged so that all four elements 18, 19, 21, and 22 are mutually parallel and at 45° to the center line 28 joining the focal point 14 and the center of one parabolic mirror 13. Conversion unit 16 is arranged similarly with respect to center line 29 between the other parabolic mirror 13 and its focal point 14, with the reflecting surfaces of splitter plates 18 and 27 being located at the focal distances from their respective parabolic mirrors 13. Now, if the light source 17 is imaged at the surface of plate 18 by means of any suitable lens 31, half the surface of mirror 13 is illuminated by light reflected at plate 18 and then reflected at mirrors 19 and 22, this beam of light being designated 32. The other half of the surface of mirror 13 is illuminated by light transmitted through plate 18 and reflected at mirror 21, this beam being designated 33.

Beams 32 and 33 are then reflected by mirror 13 in parallel through one window 12, portion 11, and the other window 12 to the other parabolic mirror 13. Beam 32 is then reflected by mirror 13 to mirror 25, from which it is reflected through splitter plate 27 to camera 23. Beam 33 is reflected from mirror 13, and from mirrors 26 and 24, to plate 27, from which it is reflected to camera 23. The cross-section of beams 32 and 33, as viewed along lines 2—2 and 3—3 of Fig. 1, are shown in Figs. 2a and 3a. It is thus seen that with this initial setup there is no overlapping of beams 32 and 33, and there are no coherent rays and no interference.

To obtain interference between beams 32 and 33, splitter plate 18 is rotated through an angle $x/2$, where $x$ is one half the aperture ratio of the parabola of parabolic mirror 13. After rotation of plate 18 through this angle, beams 32 and 33 are derived from the same part of the one beam from source 17 incident upon plate 18. Any ray in this beam incident upon plate 18 is split into two coherent rays of lesser intensity, one such ray 34 entering beam 32 and the other such ray 35 entering beam 33. Beams 32 and 33 are now coherent and can be made to interfere, the cross-sections of the beam being indicated in Figs. 2b and 3b. By rotating splitter plate 27 through angle $x/2$, the two coherent beams are made to overlap in the image of camera 23, the optical path difference between the beams being made zero by translation of mirror 25. The cross-sections of beams 32 and 33, and the location of coherent rays 34 and 35 and a second pair of coherent rays 36 and 37, are indicated in Figs. 2c and 3c.

The adjustments of plates 18 and 27 to obtain the beam arrangements shown in Figs. 2c and 3c may be termed the infinite fringe adjustment (a fringe of infinite width), and it is then necessary to adjust unit 16 further in order to obtain many fringes which are in focus at the virtual center of the plane of portion 11. This further adjustment of unit 16 is made by rotating mirror 25 and plate 27 in the manner set forth below.

Figure 4:
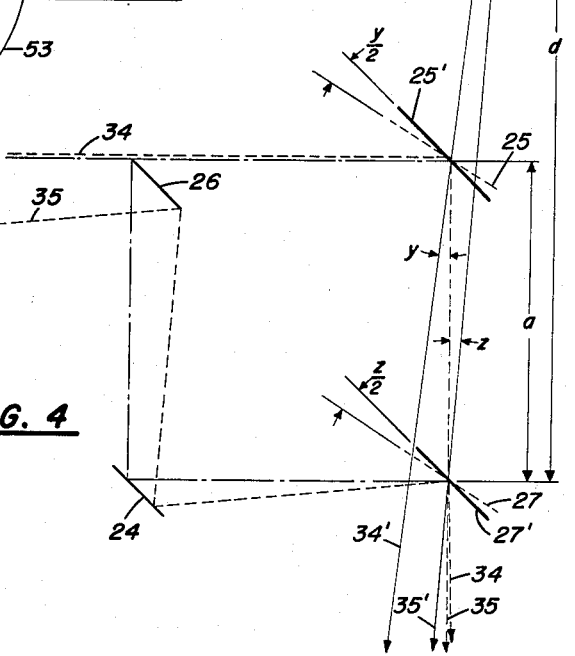
Fig. 4 is a schematic diagram of the receiver unit of Fig. 1, illustrating the mode of adjustment of this unit for fine fringes.

Referring now to Fig. 4, the various elements of unit 16 are shown in their positions for infinite fringe adjustments, coherent rays 34 and 35 being shown in this condition as dotted lines. If mirror 25 is rotated from its dotted line position through an angle $y/2$ to the solid line position, designated 25', ray 34 will now be reflected by mirror 25' to a position designated 34'. Rays 34' and 35 will now intersect at mirror 25', a distance $a$ from plate 27. To move this point of intersection to the plane 38 of tunnel 11, plate 27 is rotated from its dotted line position through an angle $z/2$ to its solid line position designated 27'. Thus, ray 35 will now be reflected by plate 27' to a position 35', and rays 34' and 35' will intersect at an angle $w$, the point of intersection being a distance $d$ from plate 27'.

From the geometry of Fig. 4, and under the assumption that angles $w$, $y$ and $z$ are very small, it is readily apparent that $$z = y - w$$

and $$w = y\frac{a}{d}$$

Therefore, substituting for $w$ in the first equation, $$z = y - y\frac{a}{d}$$

and $$\frac{z}{y} = 1 - \frac{a}{d}$$

Since the distance $d$ is usually much greater than $a$, approximately equal rotation of mirror 25 and plate 27 is required. Furthermore, since, in most large two-mirror schlieren systems, tunnel 11 is at the focal distance from mirror 13, optical distance $d$ is infinite and angles $z$ and $y$ are equal. The angle $w$ is the measure of the spacing of the virtual fringes in tunnel 11.

With the light path shown in Fig. 4, it is seen that the direction of rays 34' and 35' emerging from plate 27 has changed with the adjustment for fine fringes. This change will cause the image to shift slightly across camera 23. Actual tests have shown that the shifting of the image is not sufficient to be objectionable, and does not in any way detract from the value of the attained results. It is also possible to eliminate the shifting by using the alternate beam emerging from plate 27.

Referring now to Fig. 5, there is shown a modification of the system of Fig. 1 which would permit the measurement of absolute densities in medium-size tunnels. There is shown in Fig. 5 a portion 51 of a wind tunnel having windows 52, a source conversion unit 55, a receiver conversion unit 56, and a pair of parabolic mirrors 53. In this arrangement, the reference beam 63, which is the lower beam, passes around tunnel 51, tunnel 51 being constructed with one relatively thin wall for a minimum loss of field, as shown in Fig. 6, test beam 64 being indicated therein.

Figure 6:
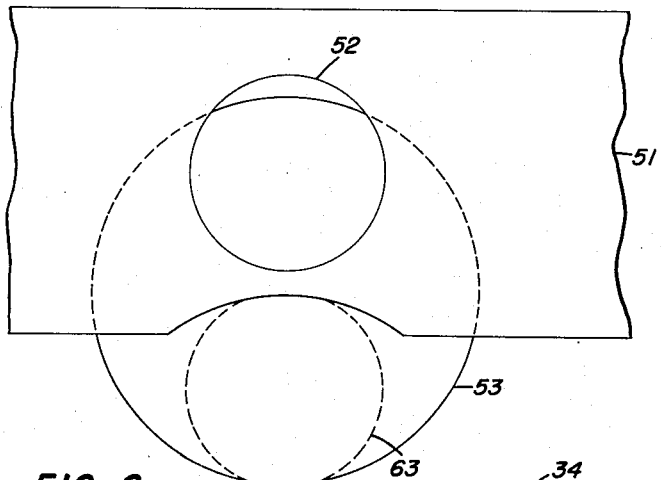
Fig. 6 is an enlarged sectional view taken along the line 6—6 of Fig. 5.

As shown in Fig. 6, mirror 53 has a diameter of twice the value as that of windows 52. Since actual laboratory experience indicates such arrangements are feasible, it is apparent that this requirement of the present invention is justifiable from a practical standpoint.

In Fig. 7 there is shown another embodiment of the present invention which employs a single conversion unit 75 and a single spherical mirror 73 positioned in alignment with windows 72 in test portion 71 of the tunnel. In this embodiment, mirror 73 and unit 75 are positioned on opposite sides, respectively, of portion 71, the center of curvature of mirror 73 being indicated at 74.

As shown in Fig. 7, conversion unit 75 comprises a splitter plate 76, a pair of front-surface mirrors 77, 78, and a semi-disc front-surface mirror 79, each of these elements of unit 75 being mutually parallel and at 45° to the center line joining the focal point 74 and the center of the spherical mirror 73. A light source 81 is imaged at the center of plate 76 by means of any suitable lens 82, source 81 being positioned at an angle $x/2$ to the right of the center of plate 76, where $x$ is one-half the ratio of diameter to radius of curvature of the spherical mirror 73. It is seen that a portion of the light entering plate 76 is transmitted therethrough, reflected by mirror 77 and reflected by mirror 79 to form beam 83. If plate 76 is now rotated through angle $x/2$, a portion of the light entering plate 76 is reflected thereby and by mirror 78 to form beam 84. Furthermore, since the common center of beams 83 and 84 is positioned at the center of curvature 74 of mirror 73, beams 83 and 84 will pass through portion 71 to mirror 73 and be reflected back on themselves by mirror 73 to plate 76.

A camera 85 is positioned adjacent to plate 76 and is focused so that 84 enters therein by transmission through plate 76 and beam 83 enters therein by reflection from plate 76. It is apparent that this embodiment of the present invention may also be used for absolute path lengths and density measurements by passing reference beam 84 around the test portion 71, and by positioning mirror 73 so that portion 71 covers one-half the surface thereof.

It is thus seen that the present invention provides an interferometer of the differential type in which the optical splitter plates used may be a small fraction of the size of the field of view. As a result, the interferometer is relatively simple and inexpensive and less unwieldy than those of the prior art. Furthermore, the interferometer may use existing schlieren mirrors and tunnel windows as components thereof when operated as a two mirror system. Finally the conversion units are intended to be assembled as a unit along with the source of light, or the camera, or both, as the case may be, thus requiring a single supporting structure, and making the interferometer less sensitive to vibration.

It should be understood of course, that the foregoing disclosure relates to only preferred embodiments of the present invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. In combination with a wind tunnel for measuring the air density about a model therein, said tunnel having a test portion including a pair of aligned windows at opposite sides thereof, a differential interferometer comprising a source of light, light-sensitive means, splitter plate means, first opaque mirror means, second opaque mirror means, third opaque mirror means, and a reflector, said first, second and third mirror means being mutually parallel, said splitter plate means dividing the light from said source into a pair of coherent beams, one of said beams being formed by reflection of the light by said splitter means, the other of said beams being formed by transmission of the light by said splitter means, said one beam being reflected from the splitter means to the reflector by said first and third mirror means, said other beam being reflected to said reflector from said splitter means by said second mirror means, said coherent beams diverging from their respective mirrors to said reflector in side by side relationship, means including said reflector for directing one of said beams through the test portion across the model and thereafter directing the beam to said light-sensitive means, and means including said reflector for directing the other of said beams to said light-sensitive means in overlapping relationship with the first directed beam.

2. For use with a wind tunnel having a test portion, a differential interferometer comprising a source of light, light-sensitive means, splitter plate means, first opaque mirror means, second opaque mirror means, third opaque mirror means, and a reflector, said first, second and third mirror means being mutually parallel, said splitter plate means positioned in the path of the light from said source for dividing the light into a pair of coherent beams, one of said beams being formed by reflection of the light by said splitter means, the other of said beams being formed by transmission of the light by said splitter means, said one beam being reflected from the splitter means to the reflector by said first and third mirror means, said other beam being reflected to said reflector from said splitter means by said second mirror means, said coherent beams diverging from their respective mirrors to said reflector in side by side relationship, means including said reflector for directing one of said beams through the test portion and thereafter directing the beam to said light-sensitive means, and means including said reflector for directing the other of said beams to said light-sensitive means in overlapping relationship with the first directed beam.

3. In combination with a wind tunnel for measuring the air density about a model therein, said tunnel having a test portion including a pair of aligned windows at opposite sides thereof, a differential interferometer comprising a source of light, light-sensitive means, splitter plate means, first opaque mirror means, second opaque mirror means, third opaque mirror means, and a reflector, said first, second and third mirror means being mutually parallel, said splitter plate means dividing the light from said source into a pair of coherent beams, one of said beams being formed by reflection of the light by said splitter means, the other of said beams being formed by transmission of the light by said splitter means, said one beam being reflected from the splitter means to the reflector by said first and third mirror means, said other beam being reflected to said reflector from said splitter means by said second mirror means, said coherent beams diverging from their respective mirrors to said reflector in side by side relationship, and means including said reflector for directing said beams in parallel relationship through said windows and thereafter directing said beams to said light-sensitive means in overlapping relationship.

4. In combination with a wind tunnel for measuring the air density about a model therein, said tunnel having a test portion and adjacent upstream reference portion including a pair of aligned windows at opposite sides thereof, a differential interferometer comprising a source of light, light-sensitive means, splitter plate means, first opaque mirror means, second opaque mirror means, third opaque mirror means, and a reflector, said first, second and third mirror means being mutually parallel, said splitter plate means dividing the light from said source into a pair of coherent beams, one of said beams being formed by reflection of the light by said splitter means, the other of said beams being formed by transmission of the light by said splitter means, said one beam being reflected from the splitter means to the reflector by said first and third mirror means, said other beam being reflected to said reflector from said splitter means by said second mirror means, said coherent beams diverging from their respective mirrors to said reflector in side by side relationship, means including said reflector for directing one of said beams through the test portion across the model and thereafter directing the beam to said light-sensitive means, and means including said reflector for directing the other of said beams parallel to said first beam and across the reference portion and thereafter to said light-sensitive means in overlapping relationship with the first directed beam.

5. For use with a wind tunnel having a test portion, a differential interferometer comprising a source of light, light-sensitive means, splitter plate means positioned in the path of the light from said source for dividing the light into a pair of coherent beams, one of said beams being formed by reflection of the light by said splitter means, the other of said beams being formed by transmission of the light by said splitter means, said one beam being reflected from the splitter means to a first reflector by first mirror means, said other beam being reflected to said first reflector from said splitter means by second mirror means, said coherent beams diverging from their respective mirrors to said reflector in side by side relationship and being reflected parallel to each other to a second reflector, and means including the second reflector for directing the beams in overlapping relationship to said light-sensitive means.

6. The combination of claim 5, wherein said last mentioned means includes a splitter plate positioned between said second reflector and light-sensitive means.

7. In combination with a wind tunnel for measuring the air density about a model therein, said tunnel having a test portion including a pair of aligned windows at opposite sides thereof, a differential interferometer comprising a source of light, light-sensitive means, splitter plate means, first opaque mirror means, second opaque mirror means, third opaque mirror means, and a reflector, said first, second and third mirror means being mutually parallel, said splitter plate means dividing the light from said source into a pair of coherent beams, one of said beams being formed by reflection of the light by said splitter means, the other of said beams being formed by transmission of the light by said splitter means, said one beam being reflected from the splitter means to the reflector by said first and third mirror means, said other beam being reflected to said reflector from said splitter means by said second mirror means, said coherent beams diverging from their respective mirrors to said reflector in side by side relationship, means including said reflector for directing one of said beams through the test portion across the model and thereafter directing the beam to said light-sensitive means, and means including said reflector for directing the other of said beams parallel to said first beam and exteriorly of said tunnel and thereafter to said light-sensitive means in overlapping relationship with the first directed beam.

8. In combination with a wind tunnel for measuring the air density about a model therein, said tunnel having a test portion and adjacent upstream reference portion including a pair of aligned windows at opposite sides thereof, a differential interferometer comprising a source of light sensitive means, splitter plate means for dividing the light from said source into a pair of coherent beams, one of said beams being formed by reflection of the light by said splitter means, the other of said beams being formed by transmission of the light by said splitter means, said one beam being reflected from the splitter means to a reflector by first mirror means, said other beam being reflected to said reflector from said splitter means by second mirror means, said coherent beams diverging from their respective mirrors to said reflector in side by side relationship, means including said reflector and a second reflector aligned therewith for directing one of said beams through the test portion across the model and the other of said beams parallel to the one beam and across the reference portion and thereafter directing said beams to the light-sensitive means in overlapping relationship.

References Cited in the file of this patent

UNITED STATES PATENTS

| Number | Name | Date |
|---|---|---|
| 2,256,804 | Hurley | Sept. 23, 1941 |
| 2,256,855 | Zobel | Sept. 23, 1941 |
| 2,434,029 | Williams | Jan. 6, 1948 |
| 2,483,244 | Stamm | Sept. 27, 1949 |

FOREIGN PATENTS

| Number | Country | Date |
|---|---|---|
| 499,545 | Germany | June 10, 1930 |
| 509,310 | Germany | Oct. 8, 1930 |
| 386,315 | Great Britain | Jan. 12, 1932 |
| 577,377 | Germany | July 12, 1933 |
| 883,076 | France | Mar. 15, 1943 |